United States Patent Office 3,529,776
Patented Sept. 22, 1970

3,529,776
METHOD AND APPARATUS FOR COMMINUTING METALS IN AN ELECTRIC ARC
Lajos Mészáros, Szeged, Hungary, assignor to Gepipari Fovallalkozo Kisipari Szovetkezet, Budapest, Hungary, a firm
Filed Apr. 15, 1968, Ser. No. 721,311
Int. Cl. B02c 19/18
U.S. Cl. 241—1                        4 Claims

ABSTRACT OF THE DISCLOSURE

Metal powder is formed by sparking between two electrodes at least one of which is of the metal to be comminuted. The removed metal can be replaced by advancing the metal electrode, or sparking can be achieved by agitating an aggregation of metal particles while passing electric current through them. In either case, the process can be carried out with the electrodes bathed in an inert fluid such as an inert gas or a dielectric liquid. The produced powder can be collected and removed, continuously or batchwise, for example by admixture with a liquid. If the electrodes are two different metals, a bimetallic powder mixture can be produced.

---

The present invention relates to the production of metal powders by comminution in an electric arc, and more particularly to metal powders having a particle size in the range of one thousandth to one millionth of a millimeter.

The production of very finely divided metal powders is quite important in a number of fields. For example, in chemical reactions such as the production of organo-metallic compounds, the ability to initiate the reaction is largely dependent on the specific surface (that is, the ratio between total surface and weight) of the metal. When this specific surface is low, then it is necessary to use high temperature and/or catalysts. But with high specific surface, such activation may be unnecessary. Of course, if the need for special activation is eliminated, then the reaction may be conducted continuously.

The ability to produce metal powders of high specific surface according to the present invention also leads to other industrial possibilities. For example, by performing the present invention as a continuous process, it is possible also to conduct chemical reactions on a continuous process basis using as a reagent or as a catalyst the produced metal powders. It is also possible to prepare improved catalysts, air-breathing fuel cell electrodes and other products.

It is also possible, by practice of the present invention, to produce powders of two different metals. Such powders are useful in bonding together metals which cannot be united by means of ordinary processes. Instead, by interposing a layer of bimetallic powder of two such metals, it is possible to join them by powder metallurgical processes.

Accordingly, it is an object of the present invention to provide methods and apparatus for producing finely divided metal powders, in which the resulting powder will have high specific surface.

It is another object of the present invention to provide such methods and apparatus by which bimetallic powders can be produced.

Still another object of the present invention is the provision of such methods and apparatus by which metal powders can be continuously produced with removal from the production area either batchwise or continuously.

Finally, it is an object of the present invention to provide such methods which will be relatively easy and reliable to practice, and such apparatus that will be relatively simple and inexpensive to construct, easy to operate, maintain and repair, and rugged and durable in use.

Other objects and advantages of the present invention will become apparent from a consideration of the following description, taken in connection with the accompanying drawings, in which.

Figure 1:
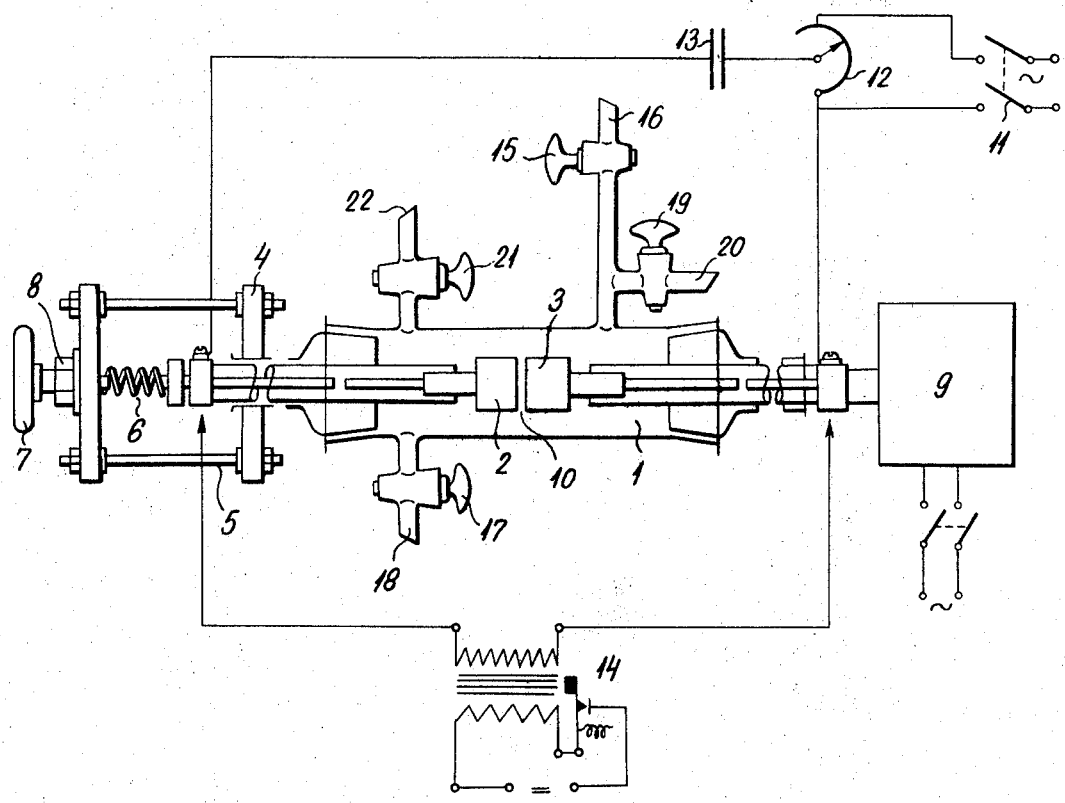
FIG. 1 is a schematic view of apparatus according to the present invention.
Figure 2:
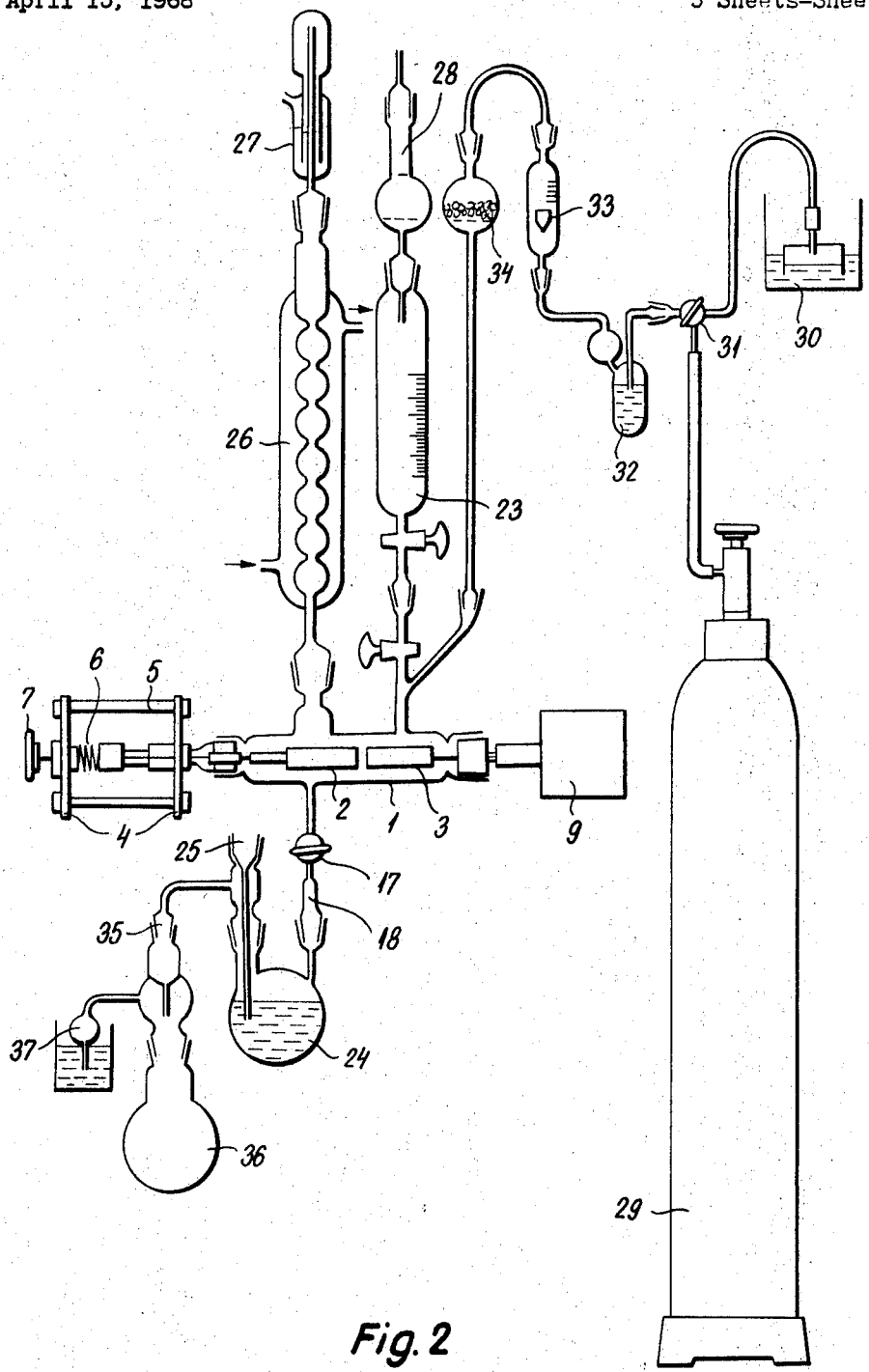
FIG. 2 is another schematic view of apparatus as in FIG. 1, but showing auxiliary equipment for use therewith.

Referring now to the drawings in greater detail, and first with respect to the embodiment of FIGS. 1 and 2, there is shown a glass reaction chamber 1 which may for example have an inside diameter of 40 millimeters and an inside length of 100 millimeters. Electrodes 2 and 3 are disposed in chamber 1 and spaced apart by a spark gap. Electrode 2 is supported on brackets 4 that are interconnected by spacers 5 and urged to the left as seen in FIGS. 1 and 2 by means of a coil compression spring 6. In this way, electrode 2 is continuously spring urged away from electrode 3. The force exerted by spring 6 may be adjusted by means of a screw 7 and a locking nut 8.

The other electrode 3 is connected to an electrically driven feeding device 9 by which electrode 3 may be continuously slowly fed toward electrode 2 so as continuously to replace the metal which is disintegrated from electrode 3 during the comminution process.

The spark gap between the electrodes 2 and 3 is indicated at 10 and sparking across this gap may be effected by varying its width mechanically or by regulation of the electric charge between the electrodes. Mechanical variation of the size of the spark gap can be effected by incorporating a vibrator in feeding device 9. Alternatively, the sparking can be effected by employing a current source 11 that feeds through a toroidal transformer 12 and a condenser 13, with a spark coil 14 in the circuit. An applied voltage of 220 volts and a capacitance of 4 microfarads is suitable for use with aluminum electrodes, in order to produce aluminum powder of a particle size in the range 1 to 10 millimicrons.

A liquid can be supplied to chamber 1, either to bathe the electrodes in the liquid and surround the spark gap with the liquid, or else simply as a film on the inner surface of chamber 1 to wash away the accumulating formed metal powder. In either event, the liquid can if desired be reactive with the metal powder formed, as for example ethyl bromide in about twice the stoichiometric amount, thereby to from monoethyl aluminum and diethyl aluminum as intermediates in the production of triethyl aluminum. To this end, a valve 15 controls the flow of such a liquid through conduit 16, a valve 17 controlling the discharge of the mixed liquid and metal products through a conduit 18. It is also possible to introduce an inert gas into the chamber 1 thereby to carry out the disintegration in an inert gaseous medium. To this end, a valve 19 controls the flow of such an inert gas through a conduit 20; while a valve 21 controls the exit of gases from the chamber 1 through a conduit 22.

With further regard to the liquid supply means, there is shown in FIG. 2 a valve-controlled vessel 23 by which liquid may be supplied in controlled amounts to chamber 1, thereby to fill chamber 1 or to form a film of liquid on the interior of chamber 1. This liquid will mix with the formed metal powder and the mixture can be withdrawn either continuously by keeping the valve 17 open, or intermittently by opening the valve 17 from time to time. The mixture of liquid and metal powder may be collected in a double-necked retort 24, while unreacted liquid may be distilled in a neutral gas atmosphere introduced through a capillary 25. To this end, a fractionating device 35 includes a collection retort 36 and a liquid seal 37 whose sealing liquid is a liquid paraffin hydrocarbon.

As the equipment tends to become heated in operation, a reflux condenser 26 is provided, with a liquid seal 27 for recapturing effluent vapors. A drying device 28 is filled with calcium chloride to prevent water from the atmosphere entering the liquid in the vessel 23.

In order to supply inert gas to the conduit 20, a nitrogen bottle 29 feeds a gas storage device 30; and nitrogen may then be sent through a three-way valve 31 to a gas washer 32 in which any oxygen content of the nitrogen is removed with pyrogallol. A rotameter 33 measures gas flow, while any water content is removed with calcium chloride in a chamber 34.

Figure 3:
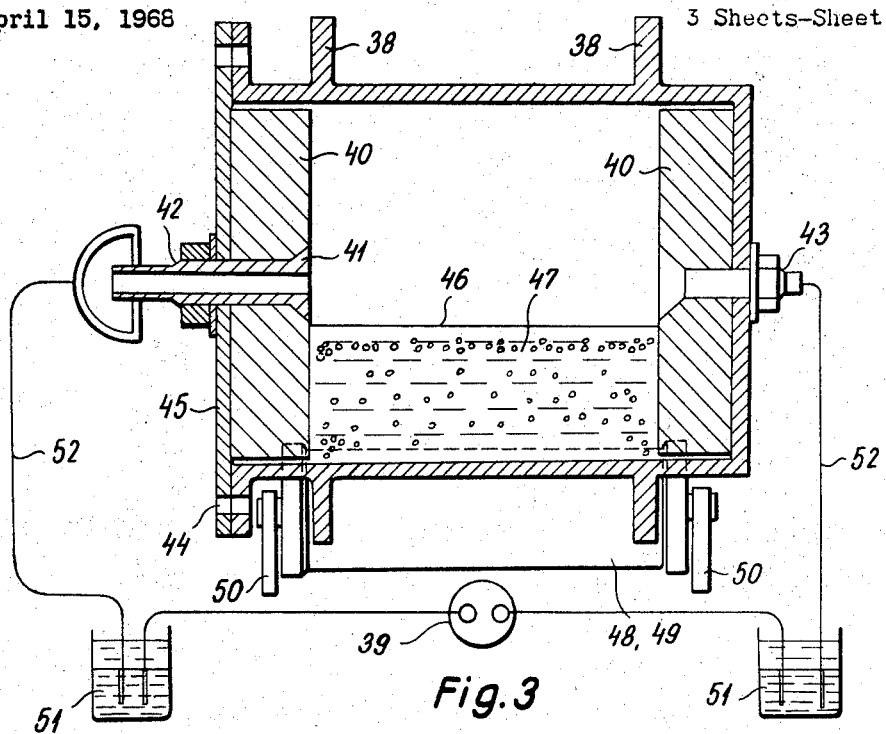
FIG. 3 is a side cross-sectional view of another embodiment of apparatus according to the present invention taken on the line 3—3 of FIG. 4.
Figure 4:
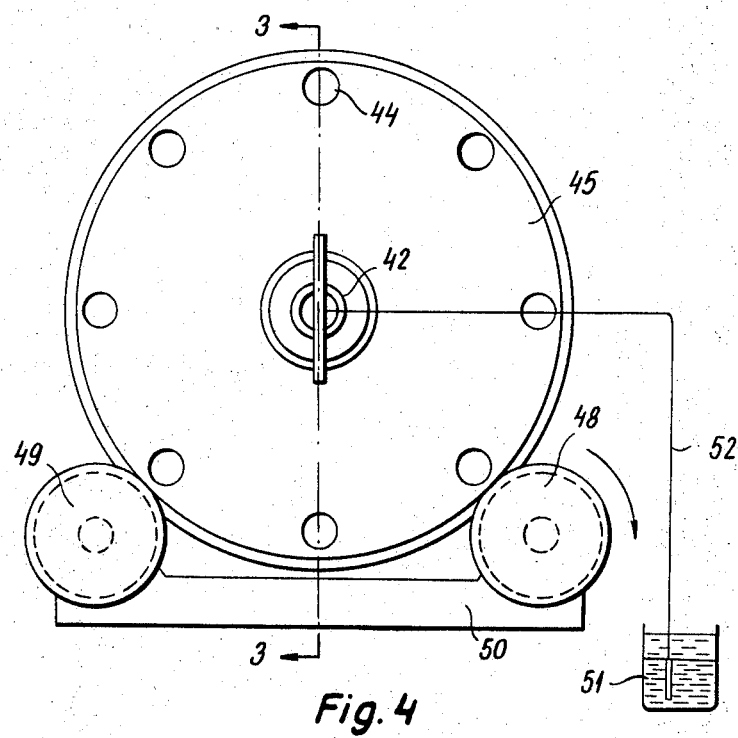
FIG. 4 is an end elevational view of the apparatus shown in FIG. 3.

The other illustrated embodiment of the invention is shown in FIGS. 3 and 4, in which a rotating drum 38 of insulating material is supported on rollers 48 and 49 for rotation about a horizontal axis. The drum walls are shown as imperforate; but if desired, they may be provided with fine openings therethrough for the discharge of formed powder.

One end of the drum is closed by a lid 45 secured to the drum by means of screws 44. Within the drum, at each end thereof, are rough castings 40 of the metal to be disintegrated. The castings 40 are fixed to the lid 45 and to the opposite internal wall of the drum as shown in FIG. 3, or they may be secured to the cylindrical wall of the drum. The chamber within the drum 38 has vapor communication through a hollow axle 41 with an appropriate source or recipient of the vapor such as inert gas to be maintained in the interior of the drum.

The electrodes which are the castings 40 are supplied with current through lead-in terminals 42 and 43 which are connected through conductors 52 with cells 51 containing liquid metal beneath a layer of insulating liquid and connected in series with a current source 39.

Inside the drums 38, an aggregation of relatively large grains 47 of metal to be comminuted is assembled, beneath a layer of dielectric liquid 46 such as toluol.

In operation, the drum 38 is rotated while maintaining electrical current across the electrodes 40 so that a great number of spark gaps are formed by the grains 47 moving relative to each other.

Instead of maintaining the liquid 46 simply within the drum 38, the entire drum 38 could be immersed in liquid.

Also, instead of rotating the drum 38, the aggregation of grains could be agitated by reciprocation as by a vibrator. Moreover, an electromagnetic field may be impressed on the aggregation of grains in a direction transverse to the electrodes so as to deflect the trajectories of the sparks transversely both to the direction of the electrodes and to the direction of the externally impressed electromagnetic field.

From a consideration of the foregoing disclosure, it will be evident that all of the initially recited objects of the invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A method of comminuting metal, comprising establishing an electric spark in a closed chamber across a gap between two electrically conductive members of which at least one is of a metal to be disintegrated, by continuously agitating an aggregation of particles of said metal while maintaining an electric circuit through said particle aggregation, thereby to disintegrate portions of said at least one member to a metal powder.

2. A method of comminuting metal, comprising establishing an electric spark in a closed chamber across a gap between two electrically conductive members of which at least one is of a metal to be disintegrated, thereby to disintegrate portions of said at least one member to a metal powder, collecting formed metal powder, and removing said collecting formed metal powder from the vicinity of the spark gap in admixture with a liquid.

3. Apparatus for producing a metal powder, comprising a closed chamber, a pair of spaced electrodes in the chamber at least one of which is of a metal to be reduced to powder, means for establishing an electrical circuit between said electrodes to produce sparking across the gap between the electrodes thereby to disintegrate at least one electrode to a metal powder, means for collecting formed metal powder, and means for applying a liquid to the formed powder to remove the formed powder from the vicinity of the spark gap.

4. Apparatus for producing a metal powder, comprising a closed chamber, a pair of spaced electrodes in the chamber at least one of which is of a metal to be reduced to powder, means for establishing an electric circuit between said electrodes to produce sparking across the gap between the electrodes thereby to disintegrate at least one electrode to a metal powder, means for collecting and removing formed metal powder from the vicinity of said spark gap, the electrodes being in the form of an aggregation of metal particles, and means to agitate the aggregation of metal particles.

References Cited

UNITED STATES PATENTS

| 2,189,387 | 2/1940 | Wissler | 264—10 |
| 2,795,819 | 6/1957 | Lezberg et al. | 264—10 |
| 3,206,755 | 9/1965 | Friedman | 241—1 X |
| 3,208,674 | 9/1965 | Bailey | 241—1 |
| 3,260,466 | 7/1966 | Wagner et al. | 241—1 |

FRANK T. YOST, Primary Examiner

U.S. Cl. X.R.

241—18, 20, 38, 98, 301